US008754556B2

(12) United States Patent
Haruno et al.

(10) Patent No.: US 8,754,556 B2
(45) Date of Patent: Jun. 17, 2014

(54) APPARATUS FOR STARTING ENGINE MOUNTED ON-VEHICLE

(75) Inventors: Kiyokazu Haruno, Anjo (JP); Mitsuhiro Murata, Niwa-gun (JP); Mikio Saito, Mizuho (JP); Masami Niimi, Handa (JP)

(73) Assignee: Denso Corporation, Kariya (JP)

( * ) Notice: Subject to any disclaimer, the term of this patent is extended or adjusted under 35 U.S.C. 154(b) by 558 days.

(21) Appl. No.: 12/762,537

(22) Filed: Apr. 19, 2010

(65) Prior Publication Data

US 2010/0264765 A1 Oct. 21, 2010

(30) Foreign Application Priority Data

Apr. 20, 2009 (JP) ................................ 2009-102214
Dec. 11, 2009 (JP) ................................ 2009-281589
Jan. 20, 2010 (JP) ................................ 2010-009832
Apr. 13, 2010 (JP) ................................ 2010-092197

(51) Int. Cl.
*H02K 11/00* (2006.01)
*H02K 7/06* (2006.01)
*F02N 11/10* (2006.01)
*H01H 67/02* (2006.01)

(52) U.S. Cl.
USPC ................ 310/71; 310/68 R; 310/83; 74/7 C; 335/126

(58) Field of Classification Search
USPC .............................. 310/68 R, 71, 83; 74/7 C
See application file for complete search history.

(56) References Cited

U.S. PATENT DOCUMENTS 4,415,812 A * 11/1983 Griffith et al. .............. 290/38 R
4,559,455 A * 12/1985 Tanaka ........................ 290/38 R
5,892,422 A * 4/1999 Montaigu et al. ............. 335/126
5,909,067 A * 6/1999 Liadakis ......................... 310/14
6,049,263 A * 4/2000 Vilou ............................ 335/126
6,148,781 A * 11/2000 Boegner et al. ............ 123/179.3
2009/0026896 A1 1/2009 Andoh
2009/0027147 A1 1/2009 Andoh

FOREIGN PATENT DOCUMENTS

FR 2294335 A * 8/1976
JP Y2-56-042437 10/1981
JP A-63-297743 12/1988

(Continued)

OTHER PUBLICATIONS

Machine Translatio JP2003297207 (2003).*

(Continued)

*Primary Examiner* — Tran Nguyen
*Assistant Examiner* — Jose Gonzalez Quinones
(74) *Attorney, Agent, or Firm* — Oliff PLC

(57) ABSTRACT

In a starter for starting an on-vehicle engine, a solenoid is provided to push a pinion gear. The solenoid has an electromagnetic coil composed of a single coil and electrically separated from a motor circuit, a fixed core, and a plunger. Supply of excitation current to the electromagnetic coil allows the fixed core to be magnetized to attract the plunger. Hence, a movement of the plunger results in a push of the movable member toward the ring gear. A switch is provided in the circuit and has a contact, a movable core, and a switch coil functioning as an electromagnet attracting the movable core in response to supply of current to the switch coil. A movement of the movable core results in on/off switching operations of the switch. The switch is allowed to operate independently of the solenoid when both the switch and solenoid are controlled.

20 Claims, 8 Drawing Sheets

(56) References Cited

FOREIGN PATENT DOCUMENTS

| | | | | |
|---|---|---|---|---|
| JP | U-63-198469 | | | 12/1988 |
| JP | U-01-148069 | | | 10/1989 |
| JP | A-07-253072 | | | 10/1995 |
| JP | A-11-030139 | | | 2/1999 |
| JP | A-2000-323323 | | | 11/2000 |
| JP | A-2002-048037 | | | 2/2002 |
| JP | A-2002-070699 | | | 3/2002 |
| JP | 2003083212 | A | * | 3/2003 |
| JP | 2003297207 | A | * | 10/2003 |
| JP | A-2008-121648 | | | 5/2008 |
| JP | A-2008-163818 | | | 7/2008 |
| JP | A-2009-030449 | | | 2/2009 |
| JP | A-2009-030450 | | | 2/2009 |
| JP | A-2009-033803 | | | 2/2009 |
| JP | A-2009-224116 | | | 10/2009 |

OTHER PUBLICATIONS

Machine Translation JP2003083212 (2003).*

Oct. 22, 2013 Office Action issued in Japanese Patent Application No. 2010-092197 (with translation).

* cited by examiner

APPARATUS FOR STARTING ENGINE MOUNTED ON-VEHICLE

CROSS-REFERENCE TO RELATED APPLICATION

This application is based on and claims the benefit of priority from earlier Japanese Patent Application Nos. 2009-102214 filed Apr. 20, 2009, 2009-281589 filed Dec. 11, 2009, 2010-9832 filed Jan. 20, 2010, and 2010-092197 flied Apr. 13, 2010, the description of which is incorporated herein by reference.

BACKGROUND OF THE INVENTION

1.Technical Field of the Invention

2.Related Art

In vehicles with engines (i.e., internal combustion engines), a starter is usually used to start the engines. Though a variety of types of starters are known, one type of such starters is provided with a magnet field type of electric motor having an armature and a field coil, a solenoid, and a switch. The solenoid is used to push, using a shift lever, a pinion gear toward a ring gear attached to an on-vehicle engine. The switch turns on/off a main contact arranged in an electric circuit for driving the motor (known as a motor circuit), in which the motor circuit drives the motor by supplying current from a battery to the motor. This kind of starter is disclosed by Japanese Utility Model No 56-42437.

In this configuration, the solenoid and the switch can be operated independently of each other. For example, only the solenoid is driven first to make the pinion gear to engage with the ring gear, and then the switch is operated to close the main contact so that the current is supplied to the motor. By this sequential operation technique, the motor can be driven to start the engine after completion of engagement between the pinion gear and the ring gear.

In the foregoing starter, the solenoid to push the pinion gear has an electromagnetic coil composed of two coils. These two coils are an attraction coil to generate a magnetic force necessary for attracting the plunger and a retention coil to generate a magnetic force necessary for retaining the attracted plunger. It is usually required that both one end of the attraction coil and one end of the retention coil be electrically connected to a connector or other electric terminal members. Further, the other end of the attraction coil is electrically connected to fixed contacts of the main contact, so that when the main contact in the motor circuit is closed by the electric switch, the attraction coil is short-circuited via the main contact, that is, no current passes through the attraction coil.

Furthermore, in the starter disclosed above, the electromagnetic coil of the solenoid and the filed coil of the motor are electrically connected by a wiring member with each other. This electrical connection intends to allow current to flow to the field coil via the electromagnetic coil without closing the main contact whenever the pinion gear is brought into contact with the ring gear axially pushed by the solenoid. In other words, the current flows through the field coil via the electromagnetic coil. This current flow makes the armature of the motor rotates slightly, thus making the pinion gear rotates slightly in response to transmission of the slight rotation of the motor armature to the pinion gear, thus allowing the pinion gear and the ring gear meshes on each other.

However, in the structure disclosed by the foregoing starter, the electric circuitry is complicated, resulting in a larger number of parts necessary for the electric circuit. In addition, various working steps are required for manufacturing the starter. Such working steps include a step in which one end of the attraction coil and one end of the retention coil are electrically connected to, for example, a connector, a step in which the other end of the attraction coil is electrically connected to the fixed contacts of the main contact, and a step in which the electromagnetic coil of the solenoid to push the pinion gear and the field coil of the motor are mutually electrically connected by a conductive wire. These many working steps result in an increase in the manufacturing costs of the starter.

Additionally, the foregoing disclosed starter has a difficulty that permanent magnets cannot be used as the magnetic field system of the motor. That is, this starter is obliged to employ a field coil as its magnetic field system. The disclosed technique by the foregoing publication cannot be applied to permanent magnet field type of motors which use permanent magnets in their magnetic field system.

SUMMARY OF THE INVENTION

The present invention has been made in consideration of the foregoing circumstances, and it is an object of the present invention to provide a starter which has the solenoid to push the pinion gear and the switch to switch open/close the main contact of the motor circuit, wherein the solenoid and the switch can be controlled independently of each other, manufacturing steps can be reduced in number by simplifying the electric circuitry, and permanent magnets and a field coil can be adopted selectively by the magnetic field system of a motor.

In order to achieve the object, the present invention provides, as one aspect thereof, a starter for a vehicle having an engine with a ring gear, comprising: an electric motor that generates a torque in response to reception of electric power supplied from a battery via an electric circuit electrically connecting the battery and the motor, the circuit relaying the power; an output shaft that rotates in response to reception of the torque from the motor, the output shaft having a longitudinal direction defined as an axial direction; a movable member having a pinion gear that transmits the torque to the ring gear and being movable on the output shaft together with the pinion gear in the axial direction; a solenoid having an electromagnetic coil composed of a single coil and electrically separated from the circuit, a fixed core, and a plunger, supply of excitation current to the electromagnetic coil allowing the fixed core to be magnetized to attract the plunger so that a movement of the plunger results in a push of the movable member toward the ring gear in the axial direction; and a switch which is provided in the circuit and which has a contact, a movable core, and a switch coil functioning as an electromagnet attracting the movable core in response to supply of current to the switch coil, a movement of the movable core resulting in on/off switching operations of the switch, the switch being allowed to operate independently of the solenoid when both the switch and solenoid are controlled.

As described, the solenoid pushing the pinion gear has a single electromagnetic coil electrically separated from the circuit for the motor. Hence, the electric circuitry can be simplified compared to the conventional. In addition, the foregoing working steps which have been necessary for manufacturing electromagnetic coils with two coils (consisting of an attraction coil and a retention coil) become unnecessary.

The starter according to the present invention can adopt any of a permanent magnet and a field coil as its motor field system. Even when adopting the field coil, it is not required to introduce a step of eclectically connecting the field coil and the electromagnetic coil of the pinion-pushing solenoid. Hence, a simplified electric circuitry leads to a reduction in the number of electric parts. The number of manufacturing steps can be reduced, which results in starter manufacturing with saved costs.

As a second aspect, the present invention provides an apparatus for starting an engine mounted in a vehicle, comprising: a starter; an excitation circuit through which the excitation current flows from an on-vehicle battery to the electromagnetic coil; a starter relay that connects the battery and the excitation circuit; a diode having a cathode and an anode, the cathode being electrically connected to a positive potential side point of the electromagnetic coil and the anode being electrically connected to the ground; and a controller that controls excitation and non-excitation operations of the electromagnetic coil via the starter relay.

In this engine starting apparatus, in response to a drive signal form the controller, the starter relay is closed (turned on), an excitation current flows from the battery to the electromagnetic coil of the pinion-pushing solenoid via the starter relay. When the controller then commands the current to stop, the starter relay is opened (turned off), thereby cutting off the excitation current. This will cause a counter electromotive force (i.e., a surge voltage) across the electromagnetic coil due to its inductance.

However, the diode is connected in parallel to the electromagnetic coil with its cathode connected to the positive potential side of the electromagnetic coil and its anode connected to the ground. Hence, the counter electromotive force can be absorbed well by the diode, whereby no current flows though the starter relay on account of the counter electromotive force. No arc discharge occurs between the contacts of the starter relay, reducing wearing of the contacts, leading to a longer duration of life of the starter.

Preferably, the apparatus is mounted in an idle stop apparatus which is capable of automatically controlling a stop and a restart of the engine, wherein the Idle stop apparatus restarts the engine during a period of time a time instant at which the engine starts to stop to a time instant at which the engine stops completely, the engine rotating during the period of time due to inertia of the engine rotation.

In this preferred example, since the operations of both the solenoid pushing the pinion gear and the switch for current supply to the motor can be controlled independently of each other, it is possible to restart the engine during its rotation due to its inertia after an engine stop is instructed by an idle stop apparatus. In this situation, the switch can be activated before the activation of the solenoid, so that the motor starts rotating prior to a movement of the pinion gear to the ring gear of the engine. This means that the pinion gear meshes with the ring gear in a state where a relative difference between the rotation numbers of the ring gear rotating due to inertia and that of the pinion gear is reduced. Hence, the mesh between both the gears becomes reliable.

DETAILED DESCRIPTION OF PREFERRED EMBODIMENTS

With reference to the accompanying drawings, hereinafter will be described some embodiments of the present invention.

(First Embodiment)

Figure 1:
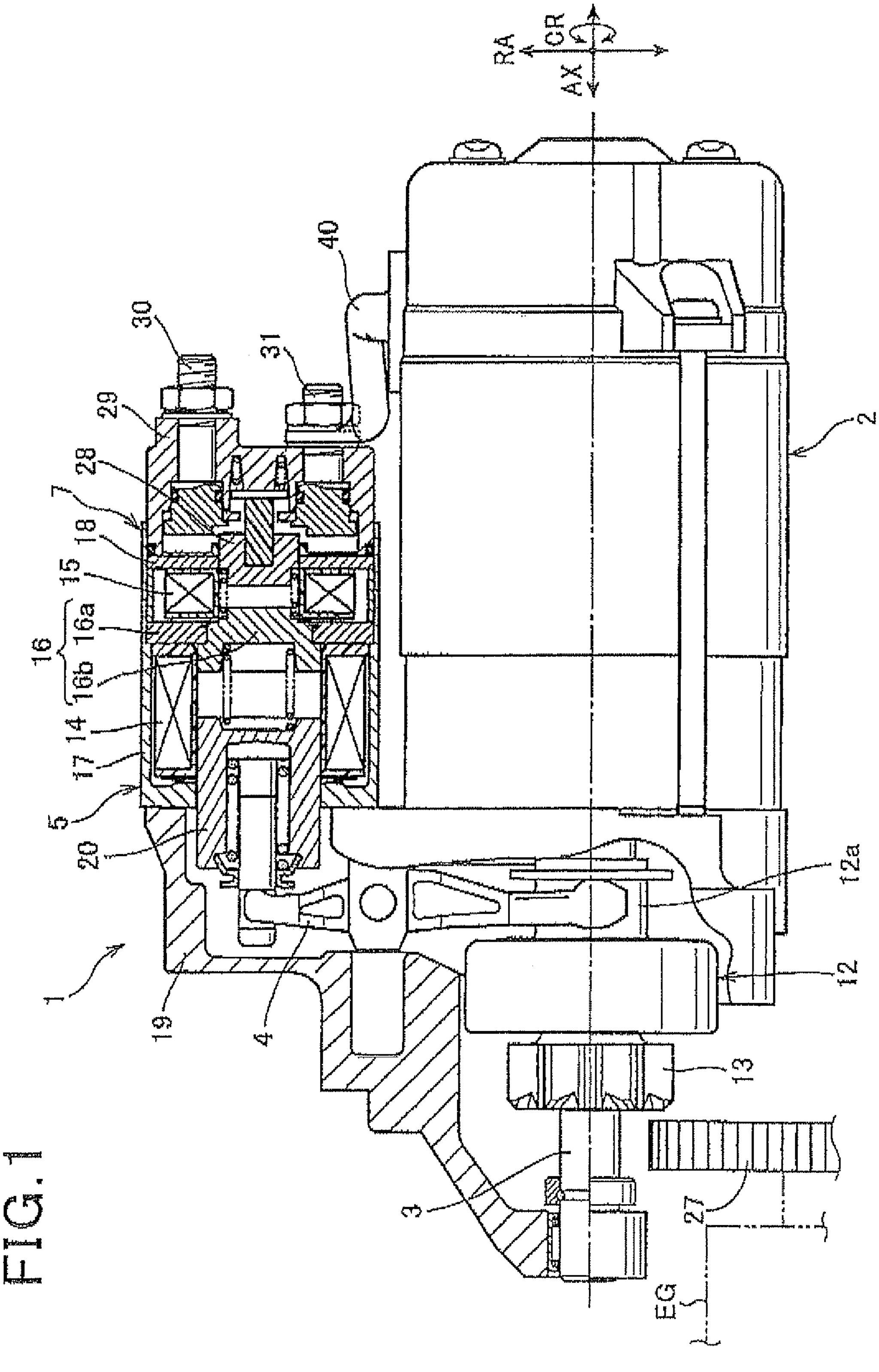
FIG. 1 is a cross-sectional view illustrating a starter according to a first embodiment of the present invention.
Figure 2:
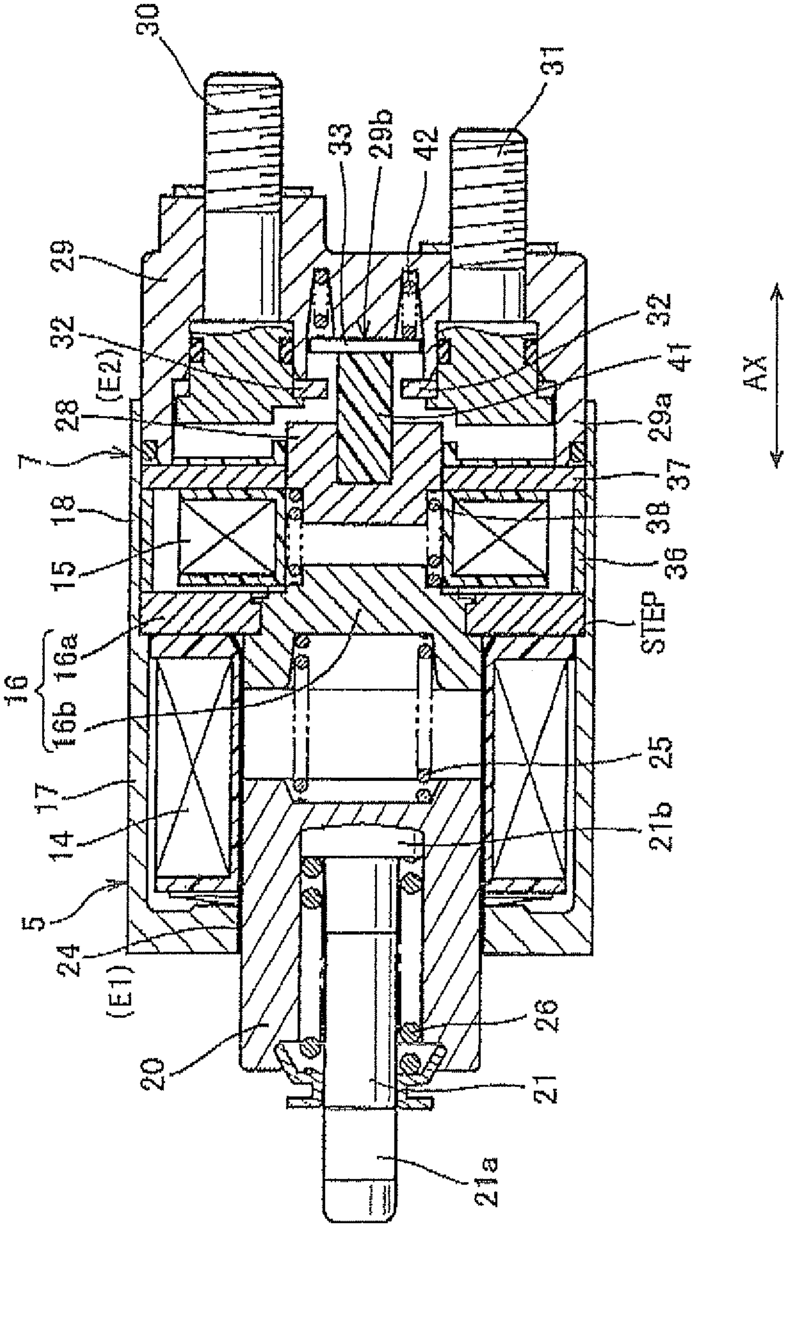
FIG. 2 is a cross-sectional view illustrating a solenoid unit (a pinion-pushing solenoid and a motor electrification switch) according to the first embodiment.
Figure 3:
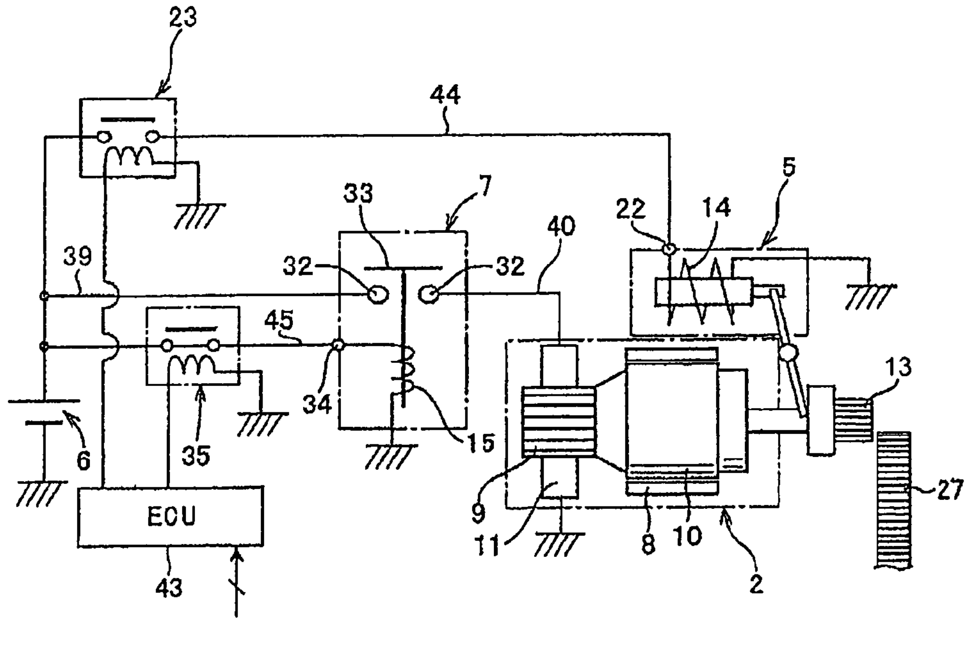
FIG. 3 is an electrical circuit diagram illustrating an apparatus for starting an engine according to the first embodiment.

Referring to FIGS. 1 to 3, an apparatus for starting an on-vehicle engine according to a first embodiment of the present invention will be described.

The apparatus for starting the engine of the first embodiment includes a starter 1 that starts an on-vehicle engine EG. FIG. 1 is a cross-sectional view illustrating the starter 1. In the first embodiment, the apparatus for starting the engine EG is loaded in a vehicle having an idle stop system. For example, the idle stop system is able to automatically stop the engine EG when the vehicle is in pause at an intersection by a stop signal or in pause due to traffic jam or the like.

As shown in FIG. 1, the starter 1 includes a motor 2, an output shaft 3, a shift lever 4, a pinion movable body (described later), pinion-pushing solenoid 5, a battery (see FIG. 3) and a motor electrification switch 7. In the present embodiment, the output shaft has a longitudinal direction, so that directions along the longitudinal direction can be defined as an axial direction AX, directions radiating from the axial direction AX along a plane perpendicular to the axial direction AX can be defined as a radial direction RA, and directions around the axial direction AX can be defined as a circumferential direction CR.

The motor 2 generates torque. The output shaft 3 is rotated being transmitted with the torque of the motor 2. The pinion movable body is provided so as to be axially movable (leftward and rightward in FIG. 1) along the output shaft 3. The pinion-pushing solenoid 5 has a function of pushing the pinion movable body in a direction opposite to the motor (leftward in FIG. 1) via the shift lever 4. The motor electrification switch 7 opens/closes a main contact (described later) provided at a motor circuit which supplies current from the battery 6 to the motor 2.

FIG. 3 is an electrical circuit diagram illustrating the apparatus for starting the engine EG according to the first embodiment. For example, as shown in FIG. 3, the motor 2 is a commutator motor that includes a field magnet 8, a rectifier 9, an armature 10 and a brush 11. The field magnet 8 is configured by a plurality of permanent magnets. The armature 10 has an armature shaft with its one being provided with the rectifier 9. The brush 11 is provided on the outer periphery of the rectifier 9. The field magnet 8 of the motor 2, which is made up of the permanent magnets, may be replaced by a field electromagnet made up of a field coil.

The output shaft 3 is disposed being aligned with the armature shaft via a reduction gear (not shown). The torque of the motor 2 is transmitted being reduced by the reduction gear.

The reduction gear is a known planetary reduction gear, for example, in which a planetary carrier that picks up the orbital motion of a planetary gear is provided being integrated with the output shaft 3.

The pinion movable body is configured by a clutch 12 and a pinion gear 13, which will be described later.

The clutch 12 includes a spline sleeve 12*a* (see FIG. 1), an outer, an inner, a roller and a roller spring. The spline sleeve 12*a* is helical-spline-fitted to the outer periphery of the output shaft 3. The outer is provided being integrated with the spline sleeve 12*a*. The inner is relatively rotatably arranged at the inner periphery of the outer. The roller is located between the outer and the inner to connect/disconnect torque therebetween. The roller spring has a role of pressing the roller. The clutch 12 is provided as a one-way clutch that unidirectionally transmits torque from the outer to the inner via the roller.

The pinion gear 13 is integrated with the inner of the clutch 12 and relatively rotatably supported by the outer periphery of the output shaft 3 via bearings (not shown).

The pinion-pushing solenoid 5 and the motor electrification switch 7 have a solenoid coil (i.e., an electromagnetic coil) 14 and a switch coil 15, respectively, each of which forms an electromagnet when current is passed. A fixed core 16 is arranged between the solenoid coil 14 and the switch coil 15 so as to be commonly used by these coils. Meanwhile, a solenoid case 17 and a switch case 18 are continuously formed in the axial direction AX. Specifically, the solenoid case 17 and the switch case 18 are integrally formed to provide a single overall case. In other words, as shown in FIG. 1, the pinion-pushing solenoid 5 and the motor electrification switch 7 are arranged in series in the axial direction AX to integrally configure a solenoid unit and are fixed to a starter housing 19 so as to be parallel to the motor 2. The solenoid case 17 also serves as a magnetic yoke of the pinion-pushing solenoid 5, while the switch case 18 also serves as a magnetic yoke of the motor electrification switch 7.

FIG. 2 is a cross-sectional view illustrating the solenoid unit (the pinion-pushing solenoid 5 and the motor electrification switch 7). As shown in FIG. 2, the overall case has a bottomed cylindrical shape with one axial end (first end E1) (left side in FIG. 2) being provided with an annular bottom and the other axial end (second end E2) being opened. The outer diameter of the overall case is made even from the first end E1 to the second end E2. However, the solenoid case 17 forming a part of the overall case at the first end E1 side is ensured to be thicker than the switch case 18 forming a part of the overall case at the second end E2 side. In other words, the inner peripheral surface of the overall case has a step between the solenoid case 17 and the switch case 18.

The fixed core 16 is configured being divided into an annular core plate 16*a* and a core portion 16*b* caulked along the inner periphery of the core plate 16*a* for fixation. The core plate 16*a* has an outer circumferential surface on the coil side (first end E1 side) in the thickness-wise direction, which surface is brought into contact with the step provided at the inner periphery of the overall case, to thereby constrain the position of the fixed core 16 on the coil side.

Referring to FIGS. 2 and 3, hereinafter are described the configurations of the pinion-pushing solenoid 5 and the motor electrification switch 7, excepting the overall case (the solenoid case 17 and the switch case 18) and the fixed core 16.

a) The pinion-pushing solenoid 5 includes the solenoid coil 14, a plunger 20 and a joint 21. The solenoid coil 14 is arranged along the inner periphery of the solenoid case 17 that forms a part of the overall case on the first end E1 side. The plunger 20 is made of iron and disposed being opposed to the care portion 16*b* of the fixed core 16 and is permitted to be axially movable along the inner periphery of the solenoid coil 14. The joint 21 transmits the movement of the plunger 20 to the shift lever 4.

The solenoid coil 14 is made up of a single coil and has an end which is connected to an external connector terminal 22 (see FIG. 3) and the other end which, for example, is connected and fixed to a surface of the core plate 16*a* by welding or the like, for grounding.

The external connector terminal 22 is connected to an electrical wiring 44 so that excitation current can be passed from the battery 6 to the solenoid coil 14 via a starter relay 23 (see FIG. 3).

The solenoid coil 14 has an inner periphery at which a cylindrical sleeve 24 is disposed to slidably hold the outer periphery of the plunger 20.

When the fixed core 16 is magnetized with the supply of current to the solenoid coil 14, the plunger 20 is attracted to one end face of the core portion 16*b* against the reaction force of a return spring 25 disposed between the core portion 16*b* and the plunger 20. Then, when the current supply to the solenoid coil 14 is stopped, the plunger 20 is pushed back by the reaction force of the return spring 25 in the direction opposite to the core portion 16*b* (leftward in FIG. 2).

The plunger 20 has substantially a cylindrical shape with a cylindrical hole being formed at its radially central portion. The cylindrical hole is open at one axial end of the plunger 20 and bottomed at the other end thereof.

The joint 21 having a shape of a rod is inserted into the cylindrical hole of the plunger 20 together with a drive spring 26. Thus, the joint 21 has an end portion projected from the cylindrical hole of the plunger 20. This end portion of the joint 21 is formed with an engagement groove 21*a* with which one end portion of the shift lever 4 engages. The other end portion of the joint 21 is provided with a flange portion 21*b*. The flange portion 21*b* has an outer diameter that enables the flange portion 21*b* to be slidably movable along the inner periphery of the cylindrical hole. The flange portion 21*b*, being loaded by the drive spring 26, is being pressed against the bottom face of the cylindrical hole.

With the movement of the plunger 20, an end face of the pinion gear 13 pushed in the direction opposite to the motor via the shift lever 4 comes into contact with an end face of a ring gear 27 (see FIG. 1) which is attached to a crank shaft of the engine EG. Then, the drive spring 26 is contracted while the plunger 20 is permitted to move and attracted to the one end surface of the core portion 16*b*. Thus, the drive spring 26 accumulates reaction force that allows the pinion gear 13 to engage the ring gear 27.

b) The motor electrification switch 7 includes the switch coil 15, a movable core 28, a contact cover 29, two terminal bolts 30 and 31, a pair of fixed contacts 32, and a movable contact 33. The switch coil 15 is arranged along the inner periphery of the switch case 18 forming a part of the overall case on the second end E2 side. The movable core 28 is opposed to the core portion 16*b* of the fixed core 16 and is permitted to be movable in the axial direction AX. The contact cover 29, which is made of resin, is assembled, blocking the open end, i.e. the second end E2, of the overall case (the open end of the switch case 18). The two terminal bolts 30 and 31 are fixed to the contact cover 29. The pair of fixed contacts 32 are fixed to the two terminal bolts 30 and 31. The movable contact 33 electrically connects/disconnects so between the pair of fixed contacts 32.

The switch coil 15 is made up of a single coil and has one end which is connected to an external connector terminal 34

(see FIG. 3), and the other end which, for example, is connected and fixed to a surface of the core plate 16*a* by welding or the like, for grounding.

The external connector terminal 34 is connected to an electrical wiring 45 so that excitation current can be passed from the battery 6 to the switch coil 15 via a motor relay 35 (see FIG. 3). The external connector terminals 22 and 34 are each formed, for example, of a metal plate terminal. Ends of the respective plate terminals are provided being externally projected in the axial direction AX from the contact cover 29.

The switch coil 15 has a radially outer peripheral side on which an axial magnetic path member 36 is arranged to form a part of a magnetic path. Also, the switch coil 15 has an axial side opposite to the fixed core, on which a radial magnetic path member 37 is arranged to form a part of the magnetic path.

The axial magnetic path member 36 has a cylindrical shape and is inserted into the switch case 18 along the inner periphery thereof with substantially no gap being provided therebetween. An end face of the axial magnetic path member 36 on the first end E1 side is brought into contact with the outer peripheral surface of the core plate 16*a* to determine the axial position of the member 36.

The radial magnetic path member 37 is arranged perpendicular to the axial direction AX. The radial magnetic path member 37 has a radially outer end surface on the first end E1 side, which surface is brought into contact with an axial end face of the axial magnetic path member 36 to constrain the position of the member 37 with respect to the switch coil 15. The radial magnetic path member 37 has a round opening at its radially central portion so that the movable core 28 can move therethrough in the axial direction AX.

The fixed core 16 is magnetized upon supply of current to the switch coil 15. Then, the movable core 28 is attracted to the other end face of the core portion 16 against the reaction force of the return spring 38 disposed between the core portion 16*b* and the movable core 28. When the current supply to the switch coil 15 is stopped, the movable core 28 is pushed back in the direction opposite to the core portion (rightward in FIG. 2) by the reaction force of the return spring 38.

The contact cover 29 has a cylindrical trunk portion 29*a*. The trunk portion 29*a* is inserted into the switch case 18 along the inner periphery thereof, the switch case 18 forming a part of the overall case on the second end E2 side. The contact cover 29 is arranged, with the axial end face of the trunk portion 29*a* being in contact with a surface of the radial magnetic path member 37, and caulked and fixed to the open end, i.e. the second end E2, of the overall case.

The terminal bolt 30, one of the two terminal bolts, is connected to a battery cable 39 (see FIG. 3). The terminal bolt 31, the other of the two terminal bolts, is connected to a motor lead 40 (see FIGS. 1 and 3). This motor lead 40 serves as an electric circuit connecting the battery 6 and the motor 2 (that is, serves as a motor circuit).

The pair of fixed contacts 32, which are provided separately from (or may be provided integrally with) the two terminal bolts 30 and 31, are electrically fixed to the two terminal bolts 30 and 31 inside the contact cover 29.

The movable contact 33 is arranged so that the distance from the movable contact 33 to the movable core is larger than the distance from the pair of fixed contacts 32 to the movable core (rightward in FIG. 2). The movable contact 33 is in reception of the load of a contact spring 42 and pressed against an end face of a resin rod 41 fixed to the movable core 28. It should be appreciated that the initial load of the return spring 38 is set larger than that of the contact spring 42. Therefore, when the switch coil 15 is de-energized, the movable contact 33 is seated on an inner seat 29*b* (see FIG. 2) of the contact cover 29, with the contact spring 42 being contracted.

The main contact is formed of the pair of fixed contacts 32 and the movable contact 33. Being biased by the contact spring 42, the movable contact 33 comes into contact with the pair of fixed contacts 32 with a good pressing force. Resultantly, current is passed across the pair of fixed contacts 32 to thereby close (turn on) the main contact. When the movable contact 33 is drawn apart from the pair of fixed contacts 32, the current across the pair of fixed contacts 32 is shut down to thereby open (turn off) the main contact.

The operation of the starter 1 will be described.

The operation of the starter 1 is controlled by an ECU (electronic control unit) 43 through the starter relay 23 and the motor relay 35.

a) The case where the engine EG is normally started (i.e. the case where the user turns on an ignition switch (not shown) to start the engine EG in the state where the engine EG is fully stopped)

When an engine start signal issued by a turn-on operation of the ignition switch is inputted, the ECU 43 outputs a drive signal (turn-on signal) to the starter relay 23. Then, the starter relay 23 is turned on so that current is passed from the battery 6 to the solenoid coil 14 of the pinion-pushing solenoid 5, for magnetization of the core portion 16*b*. Then, the plunger 20 is permitted to move being attracted to the magnetized core portion 16*b*. With the movement of the plunger 20, the pinion movable body (the clutch 12 and the pinion gear 13) is pushed in the direction opposite to the motor via the shift lever 4. Then, an end face of the pinion gear 13 comes into contact with an end face of the ring gear 27 and stops.

After expiration of a predetermined period (e.g., 30 to 40 ms) from the issuance of the engine start signal, the ECU 43 outputs a drive signal (turn-on signal) to the motor relay 35 to turn on the motor relay 35. Thus, current is passed from the battery 6 to the switch coil 15 of the motor electrification switch 7 to allow the movable core 28 to be attracted to the core portion 16*b*. Then, the movable contact 33 is brought into contact with the pair of fixed contacts 32 and biased by the contact spring 42 to thereby close the main contact. As a result, current is supplied to the motor 2 to generate torque in the armature 10. The torque is then transmitted to the output shaft 3 via the reduction gear. The torque of the output shaft 3 is further transmitted to the pinion gear 13 via the clutch 12. When the pinion gear 13 rotates up to a position that enables engagement with the ring gear 27, the pinion gear 13 is permitted to engage the ring gear 27 by the reaction force accumulated in the drive spring 26. Thus, the torque is transmitted from the pinion gear 13 to the ring gear 27, whereby the engine EG is started.

b) The case where engine restart is requested in an engine stop in process performed by an idle stop system, and where the engine EG is restarted during inert revolutions prior to the full stop of the engine EG.

When conditions for automatically stopping the engine EG (e.g. the vehicle speed being zero, the brake pedal being stepped on, and the like) from an idling state are met, the ECU 43 outputs an engine stop signal to stop fuel injection and supply of intake air. As a result, the engine EG enters an engine stop process, whereby the ring gear 27 starts decreasing revolutions. When engine restart is requested while the ring gear 27 is decreasing revolutions (prior to the full stop of the engine revolutions), the ECU 43 outputs a drive signal (turn-on signal) to the motor relay 35. Upon output of the drive signal, the motor relay 35 is turned so that current is passed from the battery 6 to the switch coil 15. As a result, the main contact is closed to pass current to the motor 2, thereby generating torque in the armature 10.

Then, the ECU 43 outputs a drive signal (turn-on signal) to the starter relay 23. When the starter relay 23 is turned on, current is passed from the battery 6 to the solenoid coil 14 to operate the pinion-pushing solenoid 5. With the operation of the pinion-pushing solenoid 5, the pinion movable body is pushed in the direction opposite to the motor via the shift lever 4. Resultantly, the end face of the pinion gear 13 is brought into contact with the end face of the ring gear 27. Then, at the point when both of the gears 13 and 27 have rotated to the positions enabling engagement, the engagement between these gears is achieved. Thus, the torque of the motor 2 is transmitted from the pinion gear 13 to the ring gear 27, whereby the engine EG is restarted.

In the starter 1 of the present embodiment, the solenoid coil 14 of the pinion-pushing solenoid 5 is formed of a single coil, and the solenoid coil 14 is electrically separated from the motor circuit (i.e. the solenoid coil 14 is not connected to the motor circuit). Therefore, the circuit configuration can be simplified. In other words, some processes (e.g., a process of connecting one end of an attraction coil and one end of a holding coil to connectors or the like, and a process of electrically connecting the other end of the attraction coil to the fixed contacts 32 disposed on the motor side and configure the main contact) can be eliminated. These processes would have otherwise been required if the solenoid coil 14 is configured by two coils; an attraction coil and a holding coil.

In the starter 1 of the present embodiment, the field magnet 8 of the motor 2 is not required to be limited to a field electromagnet. Thus, either of a permanent magnet and a field coil may be usable. Use of a field coil will not necessitate establishing, connection between the solenoid coil 14 of the pinion-pushing solenoid 5 and field coil via an electrical wiring.

In this way, the circuit configuration of the starter 1 can be simplified to thereby reduce the number of parts and the number of manufacturing processes. As a result, the starter 1 can be provided at low coast.

Further, the starter 1 of the present embodiment enables independent operation of the pinion-pushing solenoid 5 and the motor electrification switch 7. Therefore, when engine restart is requested during the engine stop process performed by an idle stop system, the engine EG can be restarted during the inert revolutions prior to the full stop. In this case, as described in the above item (b) explaining operation, the motor electrification switch 7 is operated prior to the operation of the pinion-pushing solenoid 5. Specifically, current supply to the switch coil 15 prior to the solenoid coil 14 will permit the motor 2 to rotate prior to the movement of the pinion movable body toward the ring gear 27. Therefore, engagement between the pinion gear 13 and the ring gear 27 can be achieved in the state where the relative numbers of revolutions of these gears in inert revolutions have been decreased. Thus, the engine EG startability can be enhanced, while the starting noise can be reduced.

Furthermore, the pinion-pushing solenoid 5 and the motor electrification switch 7 are arranged in series in the axial direction AX. Hence, compared to a structure in which the solenoid and switch are arranged in the circumferential direction CR, an area occupied when viewed in the axial direction AX. In other words, an occupied size in the radial direction RA of the motor 2 is kept smaller. Hence, the solenoid unit according to the present embodiment can be arranged in a mounting space which is almost the same as a space required to mount a conventional type of starter electromagnetic switch with one plunger for both pushing a pinion gear and opening/closing the main contact.

Further, compared to a configuration in which the pinion-pushing solenoid 5 and the motor electrification switch 7 are independent of each other in respect of their arrangement and structures, the solenoid unit of the present embodiment is still advantageous in that the number of parts and manufacturing costs can be reduced. Unifying the cases of the solenoid 5 and switch 7 improves resistance to vibration applied.

The switch coil 15 is a single coil, so that, compared to the two-coil type of switch coil, a winding step can be shortened in time and the circuitry can be simplified. For the two-coil type of switch coil, two terminal lines for grounding are necessary, while the one-coil type of switch coil needs only one ground-side terminal line. Hence, a step for processing the ground terminal line can be facilitated.

(Second Embodiment)

Figure 4:
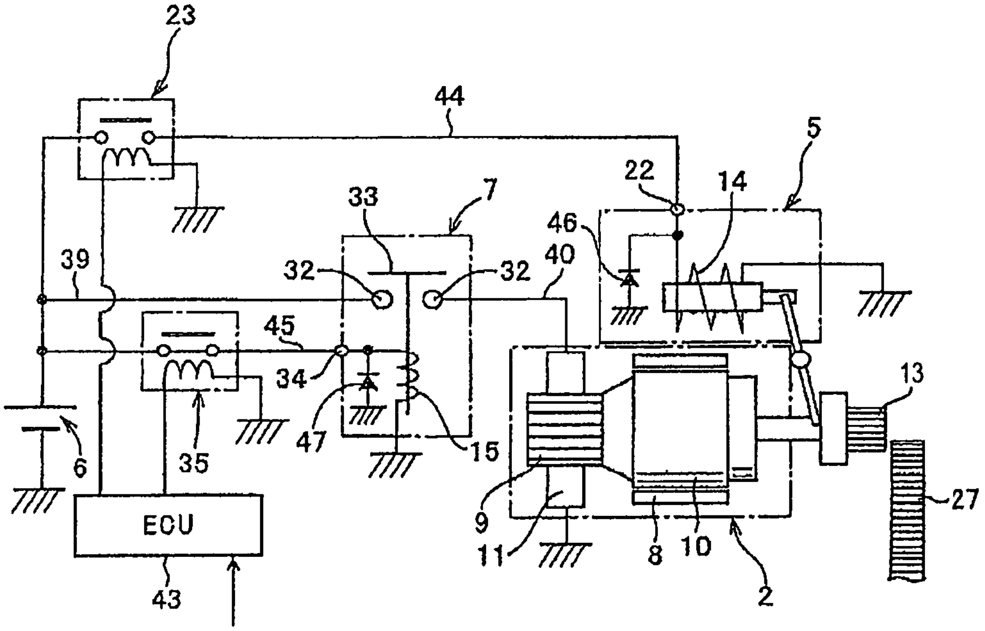
FIG. 4 is an electrical circuit diagram illustrating an apparatus for starting an engine according to a second embodiment of the present invention.

Referring now to FIG. 4, hereinafter is described an apparatus for starting an on-vehicle engine according to a second embodiment of the present invention.

In the second and the subsequent embodiments as well as in the modifications provided below, the components identical with or similar to those in the first embodiment are given the same reference numerals for the sake of omitting explanation.

The second embodiment is associated with prolonging lives of the contacts used in the starter relay 23 and the motor relay 53 described in the first embodiment.

Since the configurations of the starter 1 and the solenoid unit (the pinion-pushing solenoid 5 and the motor electrification switch 7) are the same as those in the first embodiment, the explanation Is omitted.

The solenoid coil 14 of the first embodiment has not been formed of two coils, an attraction coil and a holding coil. Instead, the solenoid coil 14 of the first embodiment has been formed of a single coil in which one end is connected to the starter relay 23 and the other end is grounded. Therefore, when the starter relay 23 is turned off and the solenoid coil 14 is de-energized, a counter electromotive force (i.e., a surge voltage) is generated by the inductance of the solenoid coil 14. With the generation of the counter electromotive force, current is passed through the starter relay 23. As a result, arc discharge occurs across the contacts of the starter relay 23. Hence, the second embodiment is directed to avoiding such arc discharges, while still gaining the various advantages described in the first embodiment.

With reference to FIG. 4, characteristics of a circuit configuration of the second embodiment, which differ from those in the first embodiment, are specifically described below. FIG. 4 is an electrical circuit diagram illustrating the apparatus for starting an engine according to the second embodiment.

In the pinion-pushing solenoid 5, a diode 46 is in parallel connected to the solenoid coil 14. Likewise, in the motor electrification switch 7, a diode 47 is in parallel connected to the switch coil 15. In other words, in the pinion-pushing solenoid 5, the cathode of the diode 46 is connected to the positive-potential side point, that is, the terminal 22, of the solenoid coil 14 and the anode is connected to the grounding side. Likewise, in the motor electrification switch 7, the cathode of the diode 47 is connected to the positive-potential side point, that is, the terminal 34, of the switch coil 15 and the anode is connected to the grounding side.

With the above configuration, when the starter relay 23 is turned off to de-energize the solenoid coil 14, the counter electromotive force generated in the solenoid coil 14 can be absorbed by the diode 46. Specifically, the solenoid coil 14 is permitted to short-circuit by the diode 46 so that the counter electromotive force generated in the solenoid coil 14 can be absorbed by the diode 46. Thus, since no current passes through the starter relay 23, arc discharge will not occur across the contacts of the starter relay 23. As a result, wearing of the contacts of the starter relay 23 can be suppressed, whereby the lives of the contacts can be suppressed from being shortened.

In the same way, when the motor relay 35 is turned off to de-energize the switch coil 15, the counter electromotive force generated in the switch coil 15 can be absorbed by the diode 47. Thus, since no current passes through the motor relay 35, arc discharge will not occur across the contacts of the motor relay 35. As a result, wearing of the contacts of the motor relay 35 can be suppressed, whereby the lives of the contacts can be suppressed from being shortened.

The two diodes 46 and 47 can be accommodated in a casing of the solenoid unit, which casing is formed of the overall case (the solenoid case 17 and the switch case 18) and the contact cover 29. In this case, not being exposed to the outside, the diodes 46 and 47 can be prevented from being deteriorated. In addition, since the diodes 46 and 47 can be connected within the casing of the solenoid unit, connector terminals are not required to be newly provided.

In this way, in the second embodiment, the lives of the contacts used in the starter relay 23 and the motor relay 35 can be prolonged. The prolongation of the lives of the contacts is particularly effective in a vehicle installing an idle stop system.

Specifically, the number of restarts of the engine EG is drastically increased (e.g., by a factor of about ten) in a vehicle installing an idle stop system, compared to a vehicle not installing an idle stop system. Therefore, preventing wearing of contacts of the starter relay 23 and the motor relay 35 for the prolongation of the lives of the contacts is of extreme importance in the circumstances where use of idle stop systems is prevailing, and may also lead to enhancing reliability of the idle stop systems.

(Third Embodiment)

Figure 5:
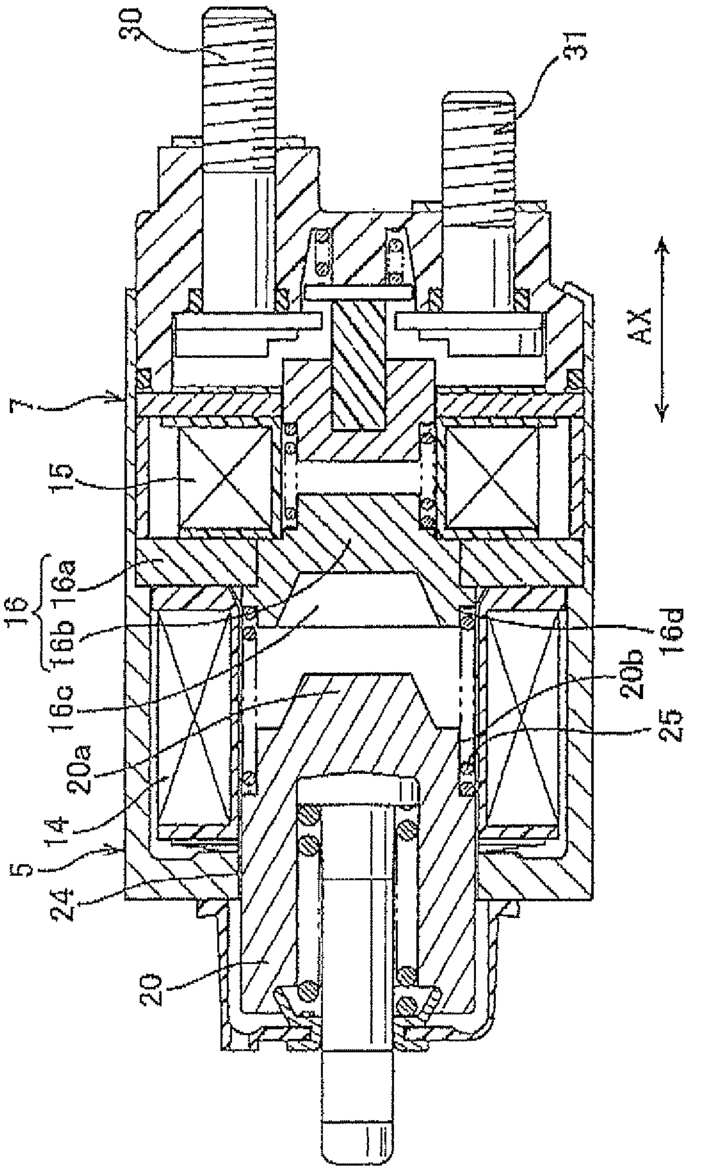
FIG. 5 is a cross-sectional view illustrating a solenoid unit according to a third embodiment of the present invention.
Figure 6:
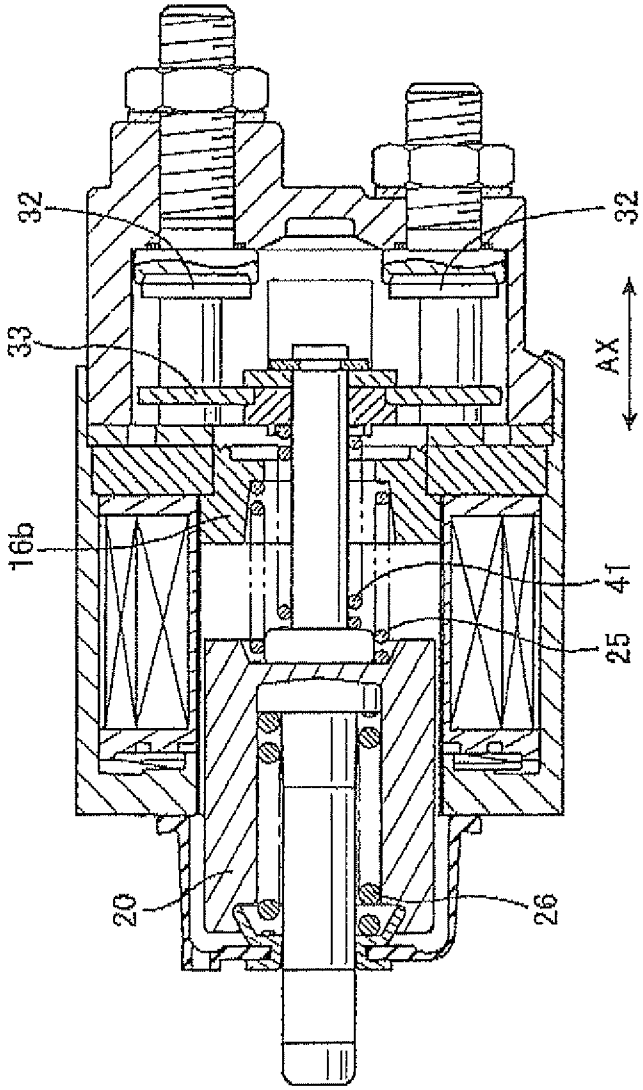
FIG. 6 PRIOR ART
FIG. 6 is a cross-sectional view illustrating an electromagnetic switch used for a starter according to conventional art.
Figure 7:
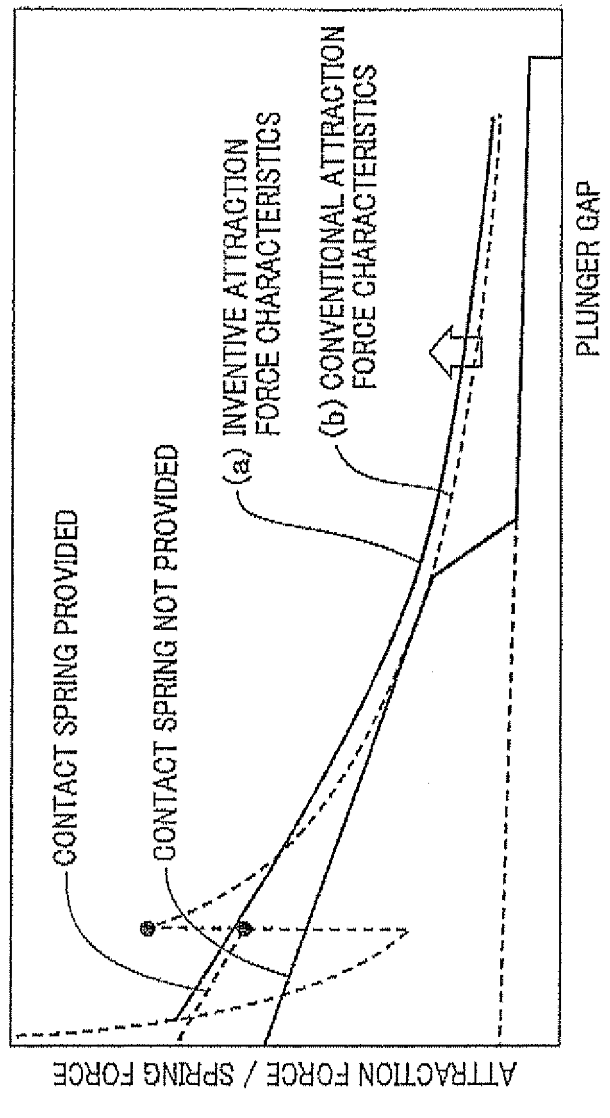
FIG. 7 is a graph illustrating spring characteristics and attraction force characteristics of an electromagnetic switch used for a starter according to conventional art and a pinion-pushing solenoid of the present invention.

Referring to FIGS. 5 to 7, an apparatus for starting an on-vehicle engine according to a third embodiment of the present invention is described.

The third embodiment is different from the first and second embodiments in that a tapered projection 20*a* is provided at the plunger 20 of the pinion-pushing solenoid 5.

FIG. 5 is a cross-sectional view illustrating a solenoid unit of the third embodiment. As shown in FIG. 5, the plunger 20 of the pinion-pushing solenoid 5 is provided with the projection 20*a* having a tapered shaped. Specifically, the plunger 20 has an end face, in a radially inner side of which the tapered projection 20*a* is provided being projected to and axially opposed to the core portion 16*b*. Meanwhile, the core portion 16*b* has an axial end face in which a tapered recess 16*c* is formed so that the projection 20*a* of the plunger 20 can be fitted thereto when the plunger 20 has been attracted to the core portion 16*b*.

Building up the plunger 20 by providing the tapered projection 20*a* at the end face may allow lots of magnetic flux to pass through the projection 20*a*. Therefore, compared to the electromagnetic switches of the conventional starters, the starter of the present embodiment can improve saturation of the flux density to thereby increase the attraction force. FIG. 6 is a cross-sectional view illustrating an electromagnetic switch used for a conventional starter. The "electromagnetic switches of the conventional starters" herein refers to an electromagnetic switch, as shown in FIG. 7, in which a single movement of the plunger 20 carries out both pushing a pinion movable body and opening/closing a main contact, or refers to an electromagnetic switch not provided with the tapered projection 20*a* at the end face of the plunger 20, which end face is opposed to the core portion 16*b* (i.e. the plunger 20 with a flat end face).

FIG. 7 is a graph illustrating spring characteristics and attraction force characteristics of an electromagnetic switch used for a conventional starter and the pinion-pushing solenoid of the present invention.

The electromagnetic switch of a conventional starter has a contact spring 41 (see FIG. 6) that pushes contacts, as well as the return spring 25 and the drive spring 26. Therefore, as indicated by the broken line (b) in FIG. 7, a required value of the attraction force becomes large at the time of achieving contact (at the time when the movable contact 33 has contacted the fixed contacts 32). As a plunger gap (the value indicated on the horizontal axis in FIG. 7) becomes smaller, the inclination of the attraction force characteristics becomes drastically large.

On the other hand, the pinion-pushing solenoid 5 of the present invention only has a function of pushing the pinion movable body toward the ring gear 27, while the function of opening/closing the main contact is performed by the motor electrification switch 7. Therefore, the required value of attraction force can be made small when the plunger gap has a size corresponding to the size at the time of achieving contact. In this regard, as indicated by the solid line (a) in FIG. 7, the attraction force can be increased in the present invention by providing the tapered projection 20*a* at the radially inner side of the end face of the plunger 20. The increase in the attraction force will lead to a decrease in the number of turns of the electromagnetic coil 14, thereby making it possible to make the electromagnetic coil 14 more compact in it size.

In addition, the inclination of the attraction force characteristics can be made small, whereby the attraction force characteristics may be permitted to turn to the characteristics more suitable for the spring characteristics.

As described above, the pinion-pushing solenoid 5 of the present embodiment is provided with the projection 20*a* at the radially inner side of the end face of the plunger 20. Therefore, the return spring 25 can be arranged radially outside of the plunger 20 and the core portion 16*b*, Specifically, as shown in FIG. 5, one end of the return spring 25 is held by a spring-holding recess 20*b* formed in a radially outer portion of the plunger 20. The other end of the return spring 25 is held by a spring-holding recess 16*d* formed in a radially outer portion of the core portion 16*b*. Thus, the return spring 25 is arranged close to the inner periphery of the sleeve 24.

In this case, a lubricant, such as grease, may be applied to the inner peripheral surface of the sleeve 24, so that the plunger 20 can smoothly move along the inner periphery of the sleeve 24. In this regard, with the arrangement of the return spring 25 close to the inner periphery of the sleeve 24 as mentioned above, the lubricant dropped from the inner peripheral surface of the sleeve 24 can be temporarily collected between wire portions of the return spring 25. Then, when the plunger 20 has been attracted to the core portion 16*b* with the contraction of the return spring 25, the lubricant is pushed out from between the wire portions of the return spring 25 and returns to the inner periphery of the sleeve 24. Thus, lubricating properties can be maintained between the sleeve 24 and the plunger 20.

(Fourth Embodiment)

Figure 8:
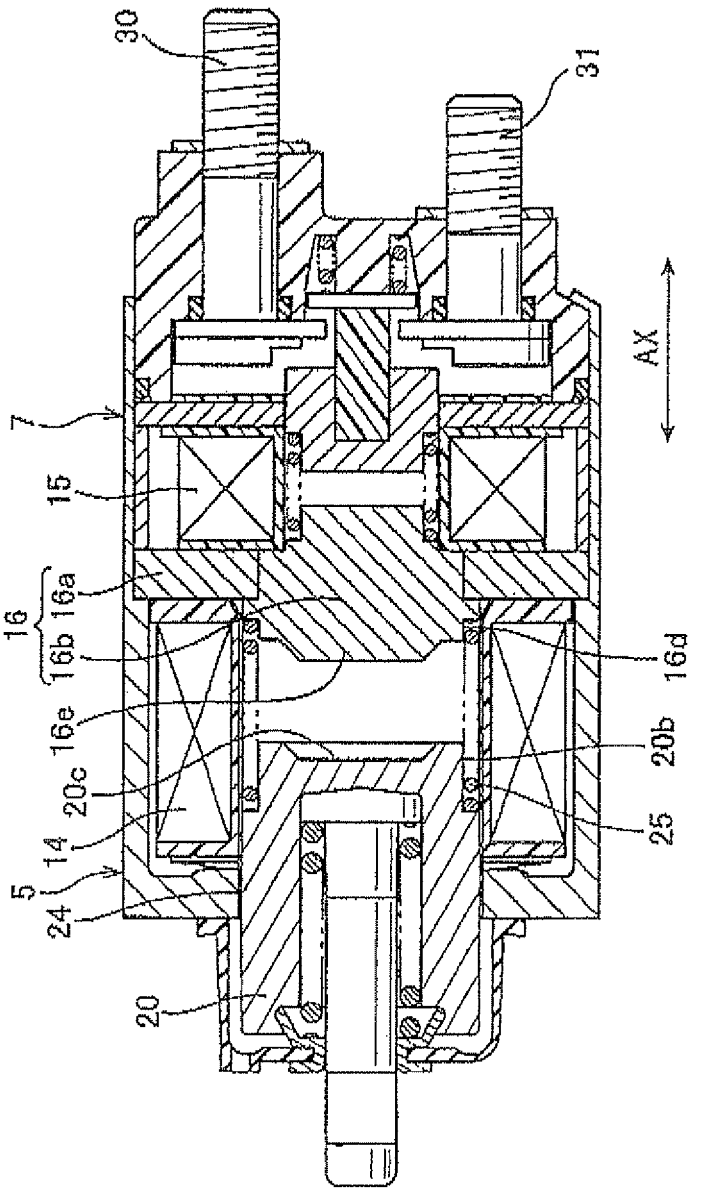
FIG. 8 is a cross-sectional view illustrating a solenoid unit according to a fourth embodiment of the present invention.

Referring to FIG. 8, an apparatus for starting an on-vehicle engine according to a fourth embodiment of the present invention is described.

FIG. 8 is a cross-sectional view illustrating a solenoid unit of the fourth embodiment. In the fourth embodiment, the core portion 16*b* is provided with a projection 16*e*. The projection 16*e* has a tapered shape and is formed so as to be axially opposed to the plunger 20 of the pinion-pushing solenoid 5.

More specifically, as shown in FIG. 8, the core portion 16*b* has an end face, in a radially inner side of which the tapered projection 16*e* is provided being projected to and axially opposed to the plunger 20. Meanwhile, the plunger 20 has an axial end face in which a tapered recess 20*c* is formed so that the projection 16*e* of the core portion 16*b* can be fitted thereto when the plunger 20 has been attracted to the core portion 16*b*.

Building up the core portion 16*b* by providing the tapered projection 16*e* at the end face may allow lots of magnetic flux to pass through the projection 16*e*. Therefore, similar to the second embodiment and compared to the electromagnetic switch of the conventional starter shown in FIG. 6, the starter of the present embodiment can improve saturation of the flux density to thereby increase the attraction force.

Similarly to that described in the second embodiment, the increase in the attraction force will lead to a decrease in the number of turns of the electromagnetic coil 14, thereby making it possible to make the electromagnetic coil 14 more compact in it size.

(Modifications)

In the first embodiment, the pinion-pushing solenoid 5 and the motor electrification switch 7 have been arranged in series in the axial direction AX to integrally configure a solenoid unit. Alternatively, however, the solenoid 5 and the switch 7 may be separately configured.

The diodes 46 and 47 of the second embodiment are not necessarily accommodated in the casing of the solenoid unit, but may be arranged outside the casing. The same applies to the case where the solenoid 5 and the switch 7 are separately configured. For example, the diode 46 may be arranged outside the casing of the solenoid 5, with the cathode being connected to the external connector terminal 22 and the anode being connected to the grounding side (e.g. to the solenoid case 17). Similarly, the diode 47 may be arranged outside the casing of the switch 7, with the cathode being connected to the external connector terminal 34 and the anode being connected to the grounding side (e.g. to the switch case 18).

For the sake of completeness, it should be mentioned that the various embodiments and modifications explained so far are not definitive lists of possible embodiments of the present invention. The expert will appreciate that it is possible to combine the various construction details or to supplement or modify them by measures known from the prior art without departing from the basic inventive principle.

What is claimed is:

1. A starter for a vehicle having an engine with a ring gear, comprising:

an electric motor that generates a torque in response to reception of electric power supplied from a battery via an electric circuit electrically connecting the battery and the motor;

an output shaft that rotates in response to reception of the torque from the motor, the output shaft having a longitudinal direction defined as an axial direction thereof;

a movable member equipped with a pinion gear that transmits the torque to the ring gear when the pinion gear is engaged with the ring gear and being movable on the output shaft together with the pinion gear in the axial direction;

a fixed core;

a solenoid equipped with a single electromagnetic coil, a return spring, and a plunger, supply of excitation current to the electromagnetic coil allowing the fixed core to be magnetized to attract the plunger and retain the attracted plunger against a force of the return spring such that a movement of the plunger results in a push of the movable member toward the ring gear in the axial direction, wherein the solenoid is electrically connected to the battery and is electrically parallel with the switch electric circuit; and a switch electrically provided in the electric circuit and arranged back-to-back to the solenoid with only the fixed core therebetween in the axial direction, wherein the switch is equipped with contacts, a movable core, a return spring, and a single switch coil functioning as an electromagnet attracting the movable core against a force of the return spring of the switch in response to supply of current to the switch coil, the fixed core functioning as a common magnetic path for magnetic flux generated by both the single electromagnetic coil and the single switch coil, a movement of the movable core enabling the contacts to open or close selectively which results in on/off switching operations of the switch, the switch being allowed to be controllable independently of the solenoid, wherein the solenoid comprises a solenoid case which contains the single electromagnetic coil, the return spring, and the plunger and which serves a magnetic yoke for the solenoid, and the switch comprises a switch case which contains the contacts, the movable core, the return spring, and the single switch coil and which serves as a magnetic yoke for the switch, the solenoid case and the switch case being formed into a single overall case in which the solenoid, the fixed core, and the switch are contained adjacently with each other in the axial direction.

2. The starter of claim 1, wherein the single overall case is cylindrical in a radial outer surface such that the single overall case has the same radially outer diameter at every position in the axial direction.

3. The starter of claim 2, wherein the return spring of the solenoid is arranged between the plunger and the fixed core and the return spring of the switch are arranged between the fixed core and the movable core in the axial direction and the return springs of both the solenoid and the switch are arranged back-to-back with only the fixed core therebetween.

4. The starter of claim 3, wherein the plunger has an end face opposed to the fixed core in the axial direction, the end face of the plunger having a tapered projection projected toward the fixed core, the projection being tapered inward in a radial direction which is along a plane perpendicular to the axial direction, and the fixed core has an end face opposed to the plunder in the axial direction, the end face of the fixed core having a recess which allows the projection to be fit thereinto when the plunger is attracted by the fixed core.

5. The starter of claim 3, wherein the fixed core has an end face opposed to the plunger in the axial direction, the end face of the fixed core having a tapered projection projected toward the plunger, the projection being tapered inward in a radial direction which is along a plane perpendicular to the axial direction, and the plunger has an end face opposed to the fixed core in the axial direction, the end face of the plunger having a recess which allows the projection to be fit thereinto when the plunger is attracted by the fixed core.

6. The starter of claim 3, wherein the solenoid comprises a cylindrical sleeve arranged along an inner circumferential surface of the electromagnetic coil and formed to slidably hold an outer circumferential surface of the plunger, wherein the return spring arranged between the plunger and the fixed core such that, when the supply of the current to the electromagnetic coil is stopped, the return spring returns the plunger toward an opposite direction to the fixed core, wherein the plunger has a recess formed on the outer circumferential surface thereof, the fixed core has a recess formed on an outer circumferential surface thereof, and the return spring has both ends one of which is held in the groove of the plunger and the other of which is held in the groove of the fixed core, both the recesses being stepped down from the outer circumferential surfaces of both the plunger and the fixed core.

7. The starter of claim 3, wherein the solenoid and the switch are arranged in series in the axial direction so as to be unified as a solenoid unit.

8. The starter of claim 3, wherein the switch coil is a single coil to which the current is supplied.

9. An apparatus for starting an engine mounted in a vehicle on which a battery is mounted, comprising:

a starter comprising:

an electric motor that generates a torque in response to reception of electric power supplied from the battery via an electric circuit electrically connecting the battery and the motor;

an output shaft that rotates in response to reception of the torque from the motor, the output shaft having a longitudinal direction defined as an axial direction thereof;

a movable member equipped with a pinion gear that transmits the torque to the ring gear when the pinion gear is engaged with the ring gear and being movable on the output shaft together with the pinion gear in the axial direction;

a fixed core;

a solenoid equipped with a single electromagnetic coil, a return spring, and a plunger, supply of excitation current to the electromagnetic coil allowing the fixed core to be magnetized to attract the plunger and retain the attracted plunger against a force of the return spring such that a movement of the plunger results in a push of the movable member toward the ring gear in the axial direction, wherein the solenoid is electrically connected to the battery and is electrically parallel with the switch electric circuit;

a switch electrically provided in the electric circuit and arranged back-to-back to the solenoid with only the fixed core therebetween in the axial direction, wherein the switch is equipped with contacts, a movable core, a return spring, and a single switch coil functioning as an electromagnet attracting the movable core against a force of the return spring of the switch in response to supply of current to the switch coil, the fixed core functioning as a common magnetic path for magnetic flux generated by both the single electromagnetic coil and the single switch coil, a movement of the movable core enabling the contacts to open or close selectively which results in on/off switching operations of the switch, the switch being allowed to be controllable independently of the solenoid;

an excitation circuit through which the excitation current flows from the battery to the electromagnetic coil;

a starter relay that connects the battery and the excitation circuit, and a controller, wherein the solenoid comprises a solenoid case which contains the single electromagnetic coil, the return spring, and the plunger and which serves a magnetic yoke for the solenoid, and a diode having a cathode and an anode, the cathode being electrically connected to a positive potential side point of the electromagnetic coil and the anode being electrically connected to the ground, the switch comprises a switch case which contains the contacts, the movable core, the return spring, and the single switch coil and which serves as a magnetic yoke for the switch, the solenoid case and the switch case being formed into a single overall case in which the solenoid. the fixed core, and the switch are contained adjacently with each other in the axial direction, and the controller is configured to control excitation and non-excitation operations of the electromagnetic coil by selectively making on and off the starter relay.

10. An apparatus for starting an engine mounted in a vehicle on which a battery is mounted, comprising:

a starter comprising:

an electric motor that generates a torque in response to reception of electric power supplied from a battery via an electric circuit electrically connecting the battery and the motor;

an output shaft that rotates in response to reception of the torque from the motor, the output shaft having a longitudinal direction defined as an axial direction thereof;

a movable member equipped with a pinion gear that transmits the torque to the ring gear when the pinion gear is engaged with the ring gear and being movable on the output shaft together with the pinion gear in the axial direction;

a fixed core;

a solenoid equipped with a single electromagnetic coil, a return spring, and a plunger, supply of excitation current to the electromagnetic coil allowing the fixed core to be magnetized to attract the plunger and retain the attracted plunger against a force of the return spring such that a movement of the plunger results in a push of the movable member toward the ring gear in the axial direction, wherein the solenoid is electrically connected to the battery and is electrically parallel with the switch electric circuit;

a switch electrically provided in the electric circuit and arranged back-to-back to the solenoid with only the fixed core therebetween in the axial direction, wherein the switch is equipped with contacts, a movable core, a return spring, and a single switch coil functioning as an electromagnet attracting the movable core against a force of the return spring of the switch in response to supply of current to the switch coil, the fixed core functioning as a common magnetic path for magnetic flux generated by both the single electromagnetic coil and the single switch coil, a movement of the movable core enabling the contacts to open or close selectively which results in on/off switching operations of the switch, the switch being allowed to be controllable independently of the solenoid, and a controller, wherein the solenoid comprises a solenoid case which contains the single electromagnetic coil, the return spring, and the plunger and which serves a magnetic yoke for the solenoid, and a diode having a cathode and an anode, the cathode being electrically connected to a positive potential side point of the electromagnetic coil and the anode being electrically connected to the ground; and the switch comprises a switch case which contains the contacts, the movable core, the return spring, and the single switch coil and which serves as a magnetic yoke for the switch, the solenoid case and the switch case being formed into a single overall case in which the solenoid, the fixed core, and the switch are contained adjacently with each other in the axial direction;

the electric circuit comprises, an excitation circuit through which the excitation current flows from the battery to the switch coil, a motor relay that connects the battery and the excitation circuit; and a diode having a cathode and an anode, the cathode being electrically connected to a positive potential side point of the switch coil and the anode being electrically connected to the ground; and the controller is configured to control excitation and non-excitation operations of the switch coil by selectively making on and off the motor relay.

11. An apparatus for starting an engine mounted in a vehicle on which a battery is mounted, comprising:

a starter comprising:

an electric motor that generates a torque in response to reception of electric power supplied from a battery via an electric circuit electrically connecting the battery and the motor;

an output shaft that rotates in response to reception of the torque from the motor, the output shaft having a longitudinal direction defined as an axial direction thereof;

a movable member equipped with a pinion gear that transmits the torque to the ring gear when the pinion gear is engaged with the ring gear and being movable on the output shaft together with the pinion gear in the axial direction;

a fixed core;

a solenoid equipped with a single electromagnetic coil, a return spring, and a plunger, supply of excitation current to the electromagnetic coil allowing the fixed core to be magnetized to attract the plunger and retain the attracted plunger against a force of the return spring such that a movement of the plunger results in a push of the movable member toward the ring gear in the axial direction, wherein the solenoid is electrically connected to the battery and is electrically parallel with the switch electric circuit;

a switch electrically provided in the electric circuit and arranged back-to-back to the solenoid with only the fixed core therebetween in the axial direction, wherein the switch is equipped with contacts, a movable core, a return spring, and a single switch coil functioning as an electromagnet attracting the movable core against a force of the return spring of the switch in response to supply of current to the single switch coil, the fixed core functioning as a common magnetic path for magnetic flux generated by both the single electromagnetic coil and the single switch coil, a movement of the movable core enabling the contacts to open or close selectively which results in on/off switching operations of the switch, the switch being allowed to be controllable independently of the solenoid;

a first excitation circuit through which the excitation current flows from the battery to the electromagnetic coil;

a starter relay that connects the battery and the first excitation circuit; and a controller, wherein the solenoid comprises a solenoid case which contains the single electromagnetic coil, the return spring, the plunger and a first diode having a cathode and an anode and which serves a magnetic yoke for the solenoid, the cathode being electrically connected to a positive potential side point of the electromagnetic coil and the anode being electrically connected to the ground;

the switch comprises a switch case which contains the contacts, the movable core, the return spring, and the single switch coil and which serves as a magnetic yoke for the switch, the solenoid case and the switch case being formed into a single overall case in which the solenoid, the fixed core, and the switch are contained adjacently with each other in the axial direction; and the electric circuit comprises, a second excitation circuit through which the excitation current flows from the on-vehicle battery to the switch coil, a motor relay that connects the battery and the second excitation circuit; and a second diode having a cathode and an anode, the cathode being electrically connected to a positive potential side point of the switch coil and the anode being electrically connected to the ground; and the controller is configured to control excitation and non-excitation operations of the electromagnetic coil by selectively making on and off the starter relay and excitation and non-excitation operations of the switch coil by selectively making on and off the motor relay.

12. The apparatus of claim 9, wherein the diode is incorporated in either the solenoid or a solenoid unit formed by unifying the solenoid and the switch in series in the axial direction.

13. The apparatus of claim 10, wherein the diode is incorporated in either the switch or a solenoid unit formed by unifying the solenoid and the switch in series in the axial direction.

14. The apparatus of claim 11, wherein the first diode is incorporated in either the solenoid or a solenoid unit formed by unifying the solenoid and the switch in series in the axial direction.

15. The apparatus of claim 11, wherein the second diode is incorporated in either the switch or a solenoid unit formed by unifying the solenoid and the switch in series in the axial direction.

16. The apparatus of claim 9, wherein the apparatus is mounted in an idle stop apparatus which is capable of automatically controlling a stop and a restart of the engine, wherein the idle stop apparatus restarts the engine during a period of time a time instant at which the engine starts to stop to a time instant at which the engine stops completely, the engine rotating during the period of time due to inertia of the engine rotation.

17. The apparatus of claim 11, wherein the first diode is incorporated in either the solenoid or a solenoid unit formed by unifying the solenoid and the switch in series in the axial direction.

18. The apparatus of claim 11, wherein the second diode is incorporated in either the switch or a solenoid unit formed by unifying the solenoid and the switch in series in the axial direction.

19. The starter of claim 4, wherein the solenoid comprises a cylindrical sleeve arranged along an inner circumferential surface of the electromagnetic coil and formed to slidably hold an outer circumferential surface of the plunger, wherein the return spring arranged between the plunger and the fixed core such that, when the supply of the current to the electromagnetic coil is stopped, the return spring returns the plunger toward an opposite direction to the fixed core, wherein the plunger has a recess formed on the outer circumferential surface thereof, the fixed core has a recess formed on an outer circumferential surface thereof, and the return spring has both ends one of which is held in the groove of the plunger and the other of which is held in the groove of the fixed core, both the recesses being stepped down from the outer circumferential surfaces of both the plunger and the fixed core.

20. The starter of claim 5, wherein the solenoid comprises a cylindrical sleeve arranged along an inner circumferential surface of the electromagnetic coil and formed to slidably hold an outer circumferential surface of the plunger, wherein the return spring arranged between the plunger and the fixed core such that, when the supply of the current to the electromagnetic coil is stopped, the return spring returns the plunger toward an opposite direction to the fixed core, wherein the plunger has a recess formed on the outer circumferential surface thereof, the fixed core has a recess formed on an outer circumferential surface thereof, and the return spring has both ends one of which is held in the groove of the plunger and the other of which is held in the groove of the fixed core, both the recesses being stepped down from the outer circumferential surfaces of both the plunger and the fixed core.

* * * * *